United States Patent [19]

Christensen et al.

[11] Patent Number: 4,820,527
[45] Date of Patent: Apr. 11, 1989

[54] METHOD OF FEEDING RUMINANTS

[75] Inventors: Børge H. Christensen, Ålsgårde; Ebbe Storm, Fredensborg, both of Denmark

[73] Assignee: Damino A/S, Gesten, Denmark

[21] Appl. No.: 159,421

[22] Filed: Feb. 4, 1988

Related U.S. Application Data

[63] Continuation of Ser. No. 760,752, Jul. 25, 1985, abandoned.

[30] Foreign Application Priority Data

Nov. 29, 1983 [DK] Denmark .............................. 5452/83
Nov. 14, 1984 [DK] Denmark .............................. 5421/84

[51] Int. Cl.$^4$ ................................................ A23K 1/00
[52] U.S. Cl. ..................................... 426/2; 426/69; 426/72; 426/74; 426/623; 426/630; 426/636; 426/656; 426/807
[58] Field of Search ................. 426/2, 69, 72, 74, 623, 426/630, 636, 807, 656, 119/71

[56] References Cited

U.S. PATENT DOCUMENTS 2,263,069  11/1941  Coyner .................................. 119/71

FOREIGN PATENT DOCUMENTS 1519164  7/1978  United Kingdom ................ 426/623
82/03159  9/1982  World Int. Prop. O. .............. 426/2

OTHER PUBLICATIONS

Morrison, "Feeds and Feeding", The Morrison Publishing Company (1957), Ithaca, New York, pp. 657–675.
McDonald et al, *Animal Nutrition,* Oliver & Boyd, Edinburgh, 1973, pp. 134–144.
Orskov, *Protein Nutrition in Ruminants,* Academic Press, 1982, pp. 7–17.

*Primary Examiner*—R. B. Penland
*Attorney, Agent, or Firm*—Birch, Stewart, Kolasch & Birch

[57] ABSTRACT

Ruminants with a fully developed rumen function are fed by a method in which the total feed is divided into two parts comprising
 (a) a liquid feed containing high-energy components, which feed is supplied while stimulating the ruminant to close its oesophageal groove, and
 (b) a solid feed containing low-energy components, which feed is supplied in such a way that the ruminant does not close its oesophageal groove, both types of feed being independently available through separate dispensing systems. One or more of the components of the liquid feed may be partially or completely hydrolyzed.

Figure 1:
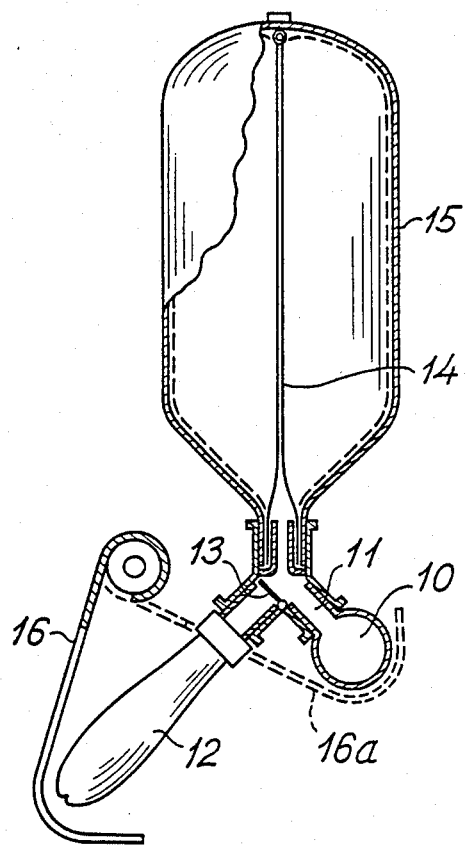

A liquid feed dispensing device (an embodiment of which is shown in FIG. 1) comprises a container, metering means and outlet means for liquid feed; the outlet means (such as a teat) are located in an enclosure for ruminants at a level substantially above the level of the shoulders of the ruminants housed in the enclosure.

45 Claims, 4 Drawing Sheets

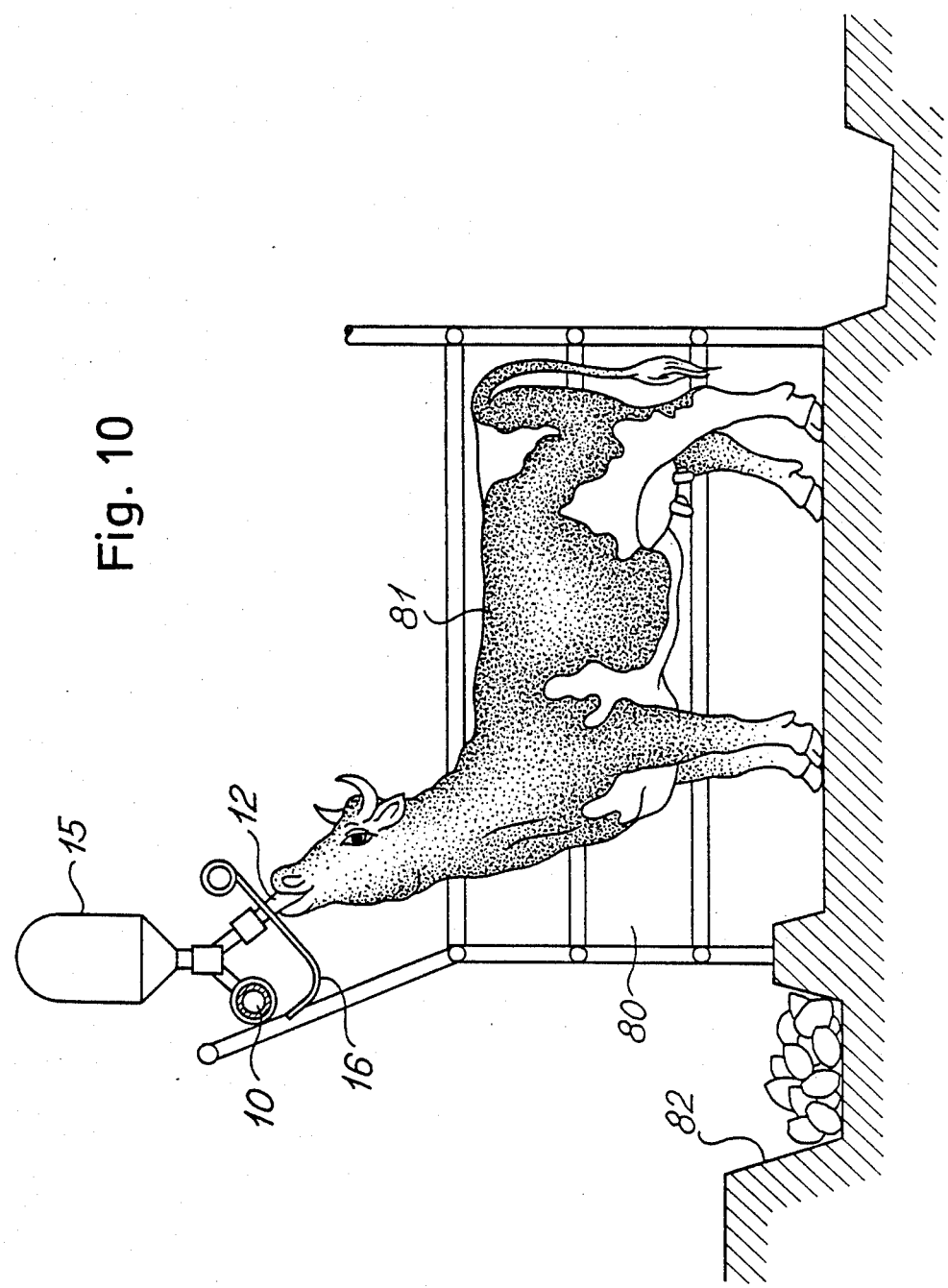

METHOD OF FEEDING RUMINANTS

This application is a continuation of application Ser. No. 760,752 filed on July 25, 1985 abandoned. This application is entitled to the benefit of PCT International Application No. PCT/DK84/00117 filed Nov. 28, 1984.

The present invention relates to a method of feeding ruminants and an enclosure for housing ruminants fed according to the method.

For centuries, ruminants have enjoyed considerable importance in the utilization of land for food production. This is closely related to the fact that when ruminants are a few weeks old, they develop a symbiotic relationship with the microflora in the rumen which makes them able to utilize nutrients with a high content of crude fibers (e.g. grass or straw), which cannot be utilized by monogastric animals, including human beings.

The microorganisms in the rumen convert a substantial part of the fibrous substances in the feed to volatile carboxylic acids (primarily acetic acid, propionic acid and butyric acid) as well as microbial proteins and nucleic acids. The carboxylic acids and certain other products of microbial metabolism are absorbed directly through the rumen wall, whereas the microbial biomass and the part of the fodder which for some reason has not been converted is passed to the abomasum where it is utilized according to the same principles as in monogastric animals.

Ruminants utilize nutrients with a low content of crude fibers (including cellulose, hemicellulose, lignin, pectins, etc.) such as grain or oilcakes less effectively than monogastric animals such as pigs or poultry, which means that, e.g., a weight gain of 1 kg in cattle requires the intake of 5-7 kg of grain-oilcake mixture, whereas a weight gain of 1 kg may be obtained in pigs with less than half of this amount of feed. The less efficient utilization of feed which is low in crude fibers, and which may, for instance, be protein-rich or fat-containing nutrients, is caused by the digestive processes taking place in rumen. Ruminants whose rumen function is not developed and whose basic feed is milk are able to close the oesophageal groove (an opening located at the end of the oesophagus which, when open, directs the ingested feed to the rumen) to form a pipe which bypasses the rumen and leads directly to the abomasum so that young ruminants show a high utilization of feed which is low in crude fibers before and during the period when they develop their rumen function to digest cellulosic feed. If an adult ruminant is given milk, the oesophageal groove will remain open and the milk will pass into the rumen and be fermented which leads to a less efficient utilization.

In adult ruminants, protein utilization is particularly poor because the major part of the feed protein is degraded to ammonia in the rumen which ammonia is partly utilized to build valuable microbial proteins and partly wasted, or substantially wasted, by being converted to urea and nucleic acids which cannot be utilized by the ruminant in larger amounts. In the abomasum and the intestines, most of the proteins from the microbial biomass and any non-degraded part of the feed protein are decomposed to small peptides and free amino acids which are absorbed through the intestinal wall and are utilized to build new proteins in the animal. This latter part of the protein conversion is as efficient in ruminants as in monogastric animals.

It has been known for several years to obtain a substantial increase in ruminant protein utilization by protecting the feed protein by means of a heat or formalin treatment in such a way that a major part of the protein passes through the rumen without being degraded. Therefore, in all major cattle-producing countries, intensive research has been performed in order to develop methods of treatment which offer a maximum protection against protein degradation in the rumen and which, at the same time, ensure that the decrease in digestibility in the abomasum and intestines which is often caused by the treatment is as low as possible.

Fat, like protein, is converted in the rumen, though with less drastic effects. The most important change is an extensive hydrogenation of any unsaturated fatty acids present in the feed due to the action of the microorganisms in the rumen so that butter fat always has a relatively low content of unsaturated fatty acids (low iodine number), even when the fat in the feed is highly unsaturated. In recent years, due to the publication of material showing the beneficial effects of using unsaturated fatty acids in human diet, butter has become unfavourably compared to, e.g., vegetable margarine which has affected the saleability of butter.

Another undesirable effect of ruminants ingesting fat in the rumen is a reduction in the digestibility of other organic materials. Although fat is a desirable component in the feed because of its low cost per feed unit (in the present context, one "feed unit" is defined as the net energy value of 1 kg of barley containing 17% of moisture), a high content of fat in the feed will cause a considerable reduction in the digestibility in the rumen of crude fibers in particular.

Concurrently with developing methods of protecting protein, it has therefore been attempted to treat fat in such a way that the negative effects of its ingestion in the rumen are eliminated or at least minimized. The best known method is a method by which fine particles of fat are distributed in a protein paste which is then formalin and/or heat treated, whereby two advantages are simultaneously obtained, in that the fat is protected by being incorporated in protected protein.

However, the protection of protein and fat has the disadvantage of being a costly process as well as reducing the digestibility of both types of substance in the abomasum and intestines.

Thus, there is a considerable need to obtain an improved utilization of the feed supplied to ruminants, especially non-cellulosic feed with a high energy content, by other means. It has now been found that it is possible to stimulate ruminants to close the oesophageal groove when ingesting liquid feed, even when they have a fully developed rumen function and even when the liquid feed is not milk or a milk substitute.

Accordingly, the present invention relates to a method of feeding a ruminant with a fully developed rumen function in which the feed is divided into two parts comprising (a) a liquid feed which is supplied while stimulating the ruminant in such a way that the oesophageal groove reflex is activated during ingestion of the liquid feed, the liquid feed comprising a solution, suspension or slurry of proteins, peptides or amino acids in an amount in the range of 25-100% by weight of the dry matter in the feed, easily digestible carbohydrates in an amount in the range of 0-50% by weight of the dry matter in the feed, and/or fats in an amount in the range of 15-100% by weight of dry matter in the feed, in an acceptable liquid such as water, plant juice, yeast cream or animal sera such as milk, whey, blood serum or whole blood, or fish solubles, and (b) a solid feed which is supplied in such a way that the oesophageal groove reflex is not activated during ingestion of the solid feed, the solid feed comprising carbohydrates which are less digestible such as cellulose or hemicellulose constituting at least about 30% of the dry matter, preferably at least about 60% of the dry matter in the feed, as well as non-protein nitrogen-containing compounds such as urea, ammonium compounds, nitrates, etc., constituting at least about 1%, preferably at least about 1.5%, of the dry matter in the feed, both types of feed being independently available through separate dispensing systems. In this method, drinking water should be available ad libitum as a thirsty animal would tend to confuse the liquid feed with drinking water which is substantially always passed to the rumen and therefore neglect to close the oesophageal groove.

The main advantages of employing the feeding method of the invention, dividing the feed constituents into a liquid and solid portion (in the following also referred to as "split-feeding") and by using controlled and biologically optimal amounts of each feed component are the following:

1. an improved feed utilization is obtained as the easily digestible feed components with a high energy content are led directly to the section of the digestive system in which they may be utilized optimally, i.e. the abomasum, while the less digestible feed components which are better utilized after exposure to the microbial enzymes in the rumen are directed to the rumen without the negative effects caused by large amounts of easily digestible components in the rumen,
2. an improved utilization of inexpensive nutrients which have a high cellulose content such as straw and non-protein nitrogen-containing compounds such as urea or ammonium compounds,
3. a higher productivity which may be obtained due to the increased and particularly, more balanced supply of absorbable substances obtained by means of split-feeding rather than conventional feeding,
4. it has become possible to regulate the content of composition of fats in the milk obtained from the ruminant by incorporating the desired content and form of the fat in the liquid feed.

When the ruminants are cattle, the improved feed utilization may be measured by a higher yield of milk and/or net weight gain obtained compared with conventionally fed animals, or, in the case of a gestating animal, a satisfactory foetal development. Of course, the most controlled demonstration of the advantageous effects obtained by the method of the invention will be to measure the quantity and composition of the excretions from the the animal and compare it to the composition and quantity of the feed ingested.

To some extent, the method of the invention shows similarities to one of the methods used to feed factory calves to obtain veal which has a characteristic pale colour. This method also utilizes a division of the feed into a liquid portion which is composed of a milk substitute and a solid portion, which is a cellulose-rich feed component such as straw which is made available to the animals in limited amounts in pelletized form. The liquid feed is ingested with closure of the oesophageal groove.

However, the method of the invention differs radically from this known method of feeding factory calves in that 1. the method of the invention is intended for ruminants with a fully developed rumen function while, due to the limited availability of the solid feed, the factory calves only develop an extremely limited rumen function and are slaughtered before their rumen is fully developed. As opposed to the method of feeding factory calves, the method of the present invention may advantageously be employed for feeding adult ruminants such as adult cows.
2. Also, ruminants fed according to the present method receive a full supply of solid feed, including cellulosic compounds. Factory calves will usually not receive more than 0.4 g cellulose/kg body weight/day corresponding to a maximum amount of 80 g cellulose/day for an animal of 200 kg. According to the present invention, however, the ruminants are supplied with cellulosic feed components corresponding to an amount of at least 2 g cellulose/kg body weight/day, which is at least five times the amount of cellulose fed to the factory calves.
3. Factory calves fed according to the method outlined above, receive about 90% of their energy supply from milk the substitute, as opposed to the method of the present invention in which the ratio between energy intake from the liquid (high energy) and solid (low energy) feed may vary from a ratio between liquid and solid feed of 75:25 to 0:100 where dairy cows are concerned, dependent on the stage of their lactation period. During the first period after parturition when their production is high and the energy requirement is correspondingly high, the amount of liquid feed will dominate the energy intake, while the less expensive solid feed will dominate the energy supply at the end of the lactation period, when the energy requirement is less high.
4. Factory calves normally receive all or almost all of their nutrient supply from milk or milk substitutes twice daily from birth to slaughtering which means that their ability to close the oesophageal groove by ingesting liquid feed may be maintained without taking any special measures. However, it must be emphasized that it is necessary to supply the solid feed after the liquid feed in order to avoid digestive problems. If the solid feed is supplied first, the calf will often neglect to close the oesophageal groove when drinking the liquid feed afterwards. This means that the liquid feed is directed to the rumen causing the problems described above.

Conversely, the method according to the invention is intended to regulate the oesophageal groove reflex under feeding conditions which are more complex than is the case with the factory calves. Above all, the larger amounts of solid feed to be ingested requires the oesophageal groove to be open for several hours of the twenty-four-hour day so that, unless special measures are taken according to the invention to avoid it, the ruminants will neglect to close the oesophageal groove when drinking the liquid feed. Furthermore, the method of the invention must be adapted to overcome the difficulties connected with the desirability of being able to vary the energy distribution between liquid and solid feed over a wide range. Where cattle are concerned, it is, e.g., not necessary to supply concentrated energy to heifers from liquid feed for long periods of time (such as from several months to nearly two years), and this is also the case with adult cows at the end of their lactation period. During such periods, the animals would lose their ability to close the oesophageal groove unless fed according to the method of the invention. Furthermore, it has been found that the order in which the liquid and solid feed are made available to the ruminant is of no importance when they are fed according to the method of the invention.

In accordance with the principle of the invention, it has been found that a biologically optimal amount of proteins, peptides or amino acids is in the range of 30–60%, especially about 50%, by weight of the dry matter in the liquid feed. The proteinaceous component employed as a constituent in the liquid feed may be any proteinaceous component which may be utilized in the abomasum and intestines of the ruminant. Thus, the proteinaceous component may comprise protein-rich byproducts of grain processing such as rice, barley, oats or wheat bran or corn gluten; legume proteins, e.g. alfalfa, soy bean, lupin, pea or broad bean proteins; and potato proteins, palm kernel cake, sunflower cake and cottonseed cake, or a mixture of any of these. It is an advantage if the protein-containing product dispensed to the ruminant has a relatively low content of carbohydrates. It has therefore been found suitable to supply the proteins in the form of animal proteins such as casein, whey, blood, serum, meat-and/or-bone meal, whole fish meal, fish solubles, krill or fish waste products proteins, or a mixture thereof. Another interesting source of proteins is biomass (also known as "single cell protein") which is produced by fermenting carbohydrate sources with a microorganism in a manner known per se. Contrary to conventional single cell protein production, it is possible to substantially dispense with the costly processes of isolating and purifying the microorganisms and drying the purified isolate as, by the method of the invention, the biomass may be supplied to the ruminants more or less as produced or at most in the form of a wet microbial isolate (e.g. yeast cream).

It has been found that the liquid feed should not contain too large amounts of easily digestible carbohydrates, cf. the explanation given below. Therefore, a suitable amount of easily digestible carbohydrates may be in the range of 5–40%, especially about 20%, by weight of the dry matter in the liquid feed, dependent on the amount of liquid feed dispensed to the ruminant per day. Most preferably, the amount of easily digestible carbohydrates corresponds to the amount contained as a residue in the proteinaceous component of cereals or other crops mentioned above. The easily digestible carbohydrates comprise sugars such as glucose, fructose, galactose, mannose or lactose, and starch, especially grain starch such as barley starch, rye starch, corn starch, oats starch, rice starch or wheat starch, or potato starch, or a mixture thereof.

As mentioned above, one of the particularly interesting features of the present invention is the fact that the quantity and composition of fats in the liquid feed may be varied within wide limits, the content of fats in the liquid feed being at least to some extent determined by the desired content of fats in the final product. The fats incorporated in the liquid feed may comprise both saturated and unsaturated fatty acids, mono-, di- or triglycerides of fatty acids, fatty esters or salts of fatty acids, and it has surprisingly been found that by the method of the invention, it has become possible to obtain the desired content of unsaturated fats in the milk by simply incorporating the desired content of unsaturated fats in the liquid feed. This has hitherto not been possible as the major part of the unsaturation bonds which might be present in the fats incorporated in the feed would become hydrogenated in the rumen, and therefore saturated, in the rumen. Thus, by the method of the present invention, unsaturated or polyunsaturated fatty acids or derivatives thereof may be incorporated in the liquid feed if a high degree of unsaturation is desired in the end product. Mono-, di- or tri-glycerides of unsaturated fatty acids which may advantageously be employed for this purpose may be selected from corn oil, peanut oil, sunflower oil, soy bean oil, mustard seed oil, rape oil, grape seed oil, olive oil or fish oil. It is interesting to note that even when using a rather pungent oil like fish oil, the resulting dairy products have not been found to have any unpleasant aftertaste. In accordance with this principle, the unsaturated fatty acids may constitute 10–100%, preferably 20–80%, in particular 30–60% such as about 40%, of the total amount of fats in the liquid feed for lactating animals. In order to increase their digestibility, the fats should preferably be in emulsified form.

Instead of supplying each of the feed components in substantially pure form, it is of course more advantageous in practice to provide the proteins, easily digestible carbohydrates and fats simultaneously, i.e. in the same feedstuff, selecting one which contains the most favourable balance between the desired feed components, which is the case when the liquid feed comprises ground, extruded or rolled, and optionally pressed or partly pressed, oil seeds (e.g. soy beans, sunflower seed, flax seed, cottonseed, peanuts, palm kernels and rape seed) in the form of a slurry thereof in a liquid. A further amount of any one or two of the feed components may optionally be added until the desired balance between proteins, easily digestible carbohydrates and fats has been obtained.

In accordance with the invention, it has in fact been found possible to supply the liquid feed in a form where it has a high proportion of dry matter, such as 15–40%, in particular 20–30%, by weight of dry matter so as to form a thick slurry or thin gruel, while still maintaining the oesophageal groove reflex, and it is not even necessary to provide the constituents in a particularly finely divided form. This is surprising, as the only liquid feed that would normally bring about the oesophageal groove closure in young ruminants is milk or milk substitutes so that only liquid feeds with the taste and consistency of milk could be expected to stimulate this closure.

One or more of the components of the liquid feed may be partially or completely hydrolyzed in order to reduce the limitations in feed utilization caused by too little or no enzymatic activity in the abomasum and intestines for the hydrolysis of some of the components of the liquid feed at the rate necessary for optimal feed utilization. Especially, it has been found necessary to both reduce the amount of carbohydrates and substantially provide them as monosaccharides or lactose only, as the enzymes necessary to degrade carbohydrates are not found in the abomasum and intestines of ruminants. The only exceptions to this general rule (that is, that only monosaccharides can be utilized in the ruminant abomasum and intestines) seem to be lactose and, presumably, minor amounts of starch, particularly in gelatinized form. Therefore, if higher carbohydrates (such as oligo- or polysaccharides) are present in the liquid feed (apart from lactose and minor amounts of starch as indicated above), they should be hydrolyzed to monosaccharides and/or volatile carboxylic acid, such as acetic or propionic acid, or lactic acid before the feed is supplied. It has been found that cattle are able to tolerate 1 kg/day of monosaccharides.

Hydrolysis is also an important factor in reducing the negative effects which may result from the introduction of certain proteins directly into the abomasum and intestines, as antigenic constituents of the proteins have been found to cause gastrointestinal hypersensitive reactions in the ruminants which, among other things, lead to a shortening and broadening of the villi on the intestinal mucosa which, in turn, gives rise to impaired digestion and, in extreme cases, death. To compensate for the fact that the digestive processes in the ruminant digestive tract do not readily degrade antigenic constituents or protein, the protein-containing feed component may be hydrolyzed, whereby the proteins are decomposed to polypeptides and, to some extent, smaller peptides and amino acids, and any antigenic constituents are substantially inactivated.

The hydrolysis may be effected by means of certain enzymes such as proteases and various carbohydrate-degrading enzymes. Examples of suitable enzymes are alcalase and reminase.

Another way of solving the problem of substantial amounts of carbohydrates optionally present in the liquid feed as well as the abovementioned antigenic constituents of the feed proteins is to incorporate acid-producing bacteria in the liquid feed as there are capable of converting carbohydrates to carboxylic acids such as acetic acid, propionic acid or lactic acid while at the same time providing the enzymes necessary to inactivate the antigenic constituents mentioned above. The acid-producing bacteria may be any one of the bacterial species usually found in the rumen or a combination thereof to provide the enzymes necessary to effect the hydrolysis and/or inactivation, or they may be lactic acid bacteria. Furthermore, acid-producing bacteria have been found to be beneficial for the digestion in that the incidence of bacterial infections in the intestines is reduced, which is at least partly ascribable to the formation of acid. In order to have this effect, the bacteria should be present in sufficient quantities and should be allowed to act for a sufficient period of time to provide a pH in the liquid feed of less than 6, preferably less than 5, in particular less than 4.5 (this pH may of course be obtained by adding a suitable acid). Where some lactic acid bacteria are concerned, the beneficial effect of their presence may also, to some extent, be ascribed to their production of certain antibiotics-like substances. The acid-producing bacteria, when present, also serve as antibacterial preservatives in the liquid feed. The acid-producing bacteria may be added to the liquid feed in the form of liquid, frozen or dried concentrates in an amount corresponding to an amount of $1 \times 10^6 - 1 \times 10^{10}$/ml in the liquid feed (after propagation). When acid-producing bacteria are present in the liquid feed, it is important that the liquid feed be stored and supplied in such a way that it is kept under anaerobic conditions.

According to need, the liquid feed may additionally be supplemented with amino acids such as lysine or methionine, vitamins, especially vitamin E, macrominerals such as P, K, Na, Ca, Mg, or S, trace elements such as Co, Cu, Se, Zn, Va, I, F, Mn, etc., growth-promoting agents such as antibiotics, cupric sulphate or carboxylic acids such as critic, malic, propionic or fumaric acid, hormones such as estrogens or steroids, or medicaments such as anthelmintics.

By conventional feeding, the rumen functions as a buffer between the ingested feed and the supply of nutrients to the intestines so that the latter is relatively uniform over most of the twenty-four-hour day. By split-feeding, the liquid feed is intermittently supplied, bypassing the rumen, which gives rise to the possibility of periodically straining the digestive and adsorption capacity of the intestines of highly productive animals in particular. According to the invention, this strain may partly be counteracted by dispensing the liquid feed in several smaller portions as described below. The potentially disadvantageous effect may also be countered by supplying milk or milk substitutes in the liquid feed, as, when for instance calves ingest milk or milk substitutes which bypass the rumen, the uniform supply of nutrients to the intestines is ensured by the phenomenon that the milk proteins coagulate in the abomasum through the action of the enzymes and acid present. The coagulum is then slowly degraded with a uniform release of nutrients.

However, where adult ruminants are concerned, milk proteins are usually too expensive to incorporate in the liquid feed. In accordance with the invention, it has therefore often been found useful to supplement the liquid feed with one or more agents regulating the rheological properties of the liquid feed and hence the abomasal content so as to obtain a higher velocity thereof, so that an even more uniform supply of nutrients to the intestines is obtained than is obtainable by merely dispensing the liquid feed in smaller portions.

Agents which may be useful for this purpose are thickening agents, e.g. pectin-containing substances such as potato, beet, apple or citrus pulp; hydrothermically treated (cooked) grain or seeds such as barley, corn, oats or wheat, or flax seed, and certain minerals with pronounced hydrocolloid properties (absorption capacity) such as clays, kaolin, bentonite, diatomaceous earth, colloidal silica or silicates.

A further advantageous effect of at least some of these substances is that they may prevent diarrhoeas and that they may counteract a tendency of the liquid feed to become precipitated in the abomasum.

As indicated above, in traditional feeding procedures part of the protein passed to the rumen is wasted in that part thereof is converted to urea and nucleic acids. As, in accordance with the present invention, the protein is provided in the liquid feed which passes directly to the abomasum where it may be better utilized, it is preferred that the solid feed has a content of nitrogen as free amino acids, peptides or proteins which substantially does not exceed 1.5% of the dry matter and preferably does not exceed about 1% of the dry matter in the feed in order to avoid unnecessary waste. Similarly, in order to avoid a reduction in the digestibility of cellulosic materials in the rumen due to the presence of fats therein, it is preferred that the solid feed has a content of fats which substantially does not exceed 5% of the dry matter, and preferably does not exceed about 2.5-3% of the dry matter in the feed. This reduction of the amount of fats incorporated in the solid feed is made possible by the fact that fats are amply provided in the liquid feed where their utilization is far more efficient then when they are present in the solid feed.

In accordance with the invention, it has been found advantageous to provide a feed combination which includes (a) a liquid feed comprising the easily digestible carbohydrate or proteinaceous components of forage crops, and (b) a solid feed which comprises cellulosic or fibrous components of forage crops.

The forage crop used as starting material may be selected from grass, alfalfa, clover, lupin, peas, water hyacinth, duckweed, sea lettuce, plants of the genus Mimosae, turnip tops, silage, turnips, beets and carrots. Advantageously, the two types of feed may be obtained by pressing fresh green forage crops or other fresh forage crops such as roots or tubers and separating the resulting juice comprising easily digestible proteins, carbohydrates and vitamins such as vitamin A and E (to be used as the liquid feed component) from the press cake containing the mainly cellulosic cell wall material (to be used as the solid feed component).

The fresh green forage crop to be used as the starting material may first be disintegrated, e.g. by comminution, in order to disrupt the cell walls to make the press cake material more easily digestible in the rumen. By pressing, 30% of the dry matter in the raw material may be obtained in the juice, containing about 43% of the raw protein and most of the easily digestible carbohydrates of the raw material. About 3% of the dry matter in the juice is fats. All in all, at least about 30% of the energy content of the whole crop may be obtained in the juice.

The following example may be used to illustrate the advantages of treating forge crops in this manner and dispensing them to ruminants by the method of the invention:

1 tonne of fresh alfalfa contains 200 kg of dry matter corresponding to 132 feed units. In traditional beef production, 5.5 feed units are needed to produce 1 kg of beef, i.e. 1 tonne of fresh alfalfa corresponds to the energy consumption needed to produce 24 kg of beef.

In the method of the invention, the utilization of the liquid feed may be improved in that only 2.5 feed units of liquid feed are needed to produce 1 kg of beef. The feed conversion of the solid feed is still 5.5 feed units/kg of beef.

This may be illustrated as follows:

Traditional feeding: 132 feed units→24 kg of beef

Split-feeding: 40 feed units of liquid feed→16 kg of beef 92 feed units of solid feed→17 kg of beef=a total of 33 kg of beef.

It appears from the above that the feed conversion may be improved by 37% relative to traditional feeding when dividing green forage crops into a liquid and solid part to be dispensed according to the method of the invention.

The central principle of the method of the invention is based on the recognition that it is possible to stimulate ruminants with a fully developed rumen function in such a way that the oesophageal groove reflex is activated during the ingestion of the liquid feed. The method of the invention utilizes the same principle for feeding ruminants with a fully developed rumen function which is instinctive with young, undeveloped ruminants during the period where they normally develop their rumen function, i.e. during the transitional period where they are getting accustomed to ingesting solid feed, and during which period they still have access to milk or milk substitutes which are ingested with a reflex closure of the oesophageal groove. In traditional feeding, the period is normally made as brief as possible (about 2 months) to minimize the consumption of the relatively expensive milk or milk substitutes and, in traditional feeding of adult animals, the oesophageal groove reflex is not activated even though the animals receive these products.

By the method of the invention, it has become possible to maintain or re-establish the ability of a ruminant to close its oesophageal groove beyond the weaning period by regularly supplying a liquid feed composition or by re-training the ruminant to activate its oesophageal groove reflex. At any rate, the method of the invention requires the liquid feed to be supplied through a dispensing device the presence and function of which stimulates the ruminant so that the oesophageal groove reflex is activated. Individual variation in the reactions of each animal must, however, be taken into account as some ruminants are very quickly trained to close the oesophageal groove when they receive liquid feed through the dispensing device according to the invention even though they have not been stimulated to activate this reflex for a longer period of time, while other ruminants need to be trained to ingest liquid feed through the drinking device at an early stage where the oesophageal groove closure takes place instinctively as a normal function in the daily feed intake, i.e. during the weaning period. According to the invention, the dispensing device for the liquid feed is preferably located at the feeding place in such a position that the head of the ruminant drinking from the dispensing device substantially assumes the suckling posture of an unweaned animal of the same species. This may, for instance, be obtained by placing the dispensing device, or at least the outlet from it, at such a level above the animal that it is forced to stretch its head and neck upwards in order to reach the outlet. Thus, the method of the invention utilizes the fact that ruminants, like all other mammals, possess a suckling instinct. Besides, the function specific to ruminants (a conditioned reflex) whereby suckling and closure of the oesophageal groove usually occur concomitantly, is utilized. Although suckling is not absolutely necessary in order for a ruminant to close the oesophageal groove which, in the case of cattle, is demonstrated by the fact that many calves in intensive cattle-production immediately learn to drink milk or milk substitutes from a bucket, i.e. without suckling, and such calves still close their oesophageal groove, such animals will usually "forget" how to close the oesophageal groove after full weaning, i.e. when they receive substantial amounts of solid feed. This means that when such animals are to be trained to ingest liquid feed through a dispensing device in accordance with the principle of the invention, difficulties may initially arise because they have, to a large extent, repressed the inherent interaction between suckling and closure of the oesophageal groove.

It has been found that the easiest way to train e.g. cattle for the method of split-feeding according to the invention is to teach very young calves to drink milk or milk substitutes from a dispensing device according to the invention and maintain this ability by regularly supplying liquid feed through the dispensing device so that the animals do not "forget" or repress their ability to activate the oesophageal groove reflex. However, it has surprisingly been found that most adult cows who have not received liquid feed in the form of milk or milk substitutes or in any other form since their weaning may relatively easily be trained to re-activate the oesophageal groove reflex by means of suckling at the dispensing device of the invention. In order to arouse interest in the dispensing device, it is advantageous if the animals are hungry when training is initiated, and it may furthermore be an advantage to apply a tasty substance to the part of the dispensing device where suckling is supposed to take place, e.g. molasses, and coax the animal to lick it off. The animal will then gradually learn to suckle at the dispensing device and this, in fact, satisfies an instinctive need so that the experience of suckling feels pleasant to the animal thereby persuading it to continue, the more so as they receive a reward in the form of liquid feed from the dispensing device. It has other also been found that cows are capable of learning from each other so that a cow which has already been trained to feed at the dispensing device and seems to find it pleasurable, may "inspire" other cows present to attempt suckling at the device.

Outlet means for discharging liquid feed from the dispensing device may have any suitable shape, i.e. any shape which induces an animal feeding at the device to close its oesophageal groove. Thus, the outlet means may have the form of a spout, nozzle, tap, spigot or section of a rubber tube or metal pipe, optionally provided with a suitable valve to regulate the flow of liquid feed. It is, however, preferred for the outlet means to have a teat-like shape, i.e. that, among other things, it is provided with a relatively narrow opening at the end from which the animal receives the liquid feed, as will be explained in greater detail below. It is preferred that the test is made from a plastic or resilient material such as rubber.

Although, when suckling with closure of the oesophageal groove has become associated with a specific teat, the presence, shape, consistency, smell or colour of the teat is usually sufficient to activate the reflex, it may be further reinforced by providing further stimuli of an acoustic, sensual, visual, electrical, mechanical, chemical or thermal nature, which are either used separately or as a combination of one or more of these stimuli. The stimuli may be provided at the dispensing device in the form of a device generating signals which provide these stimuli in order to, e.g., make the animals associate the signal with the excitement experienced when suckling with a closed oesophageal groove and therefore initiate feeding.

As mentioned above, it has been found possible to re-establish the activation of the oesophageal groove reflex in ruminants in which this activation has not occurred since a very early age. Thus, the method of the invention may advantageously be utilized in connection with ruminants which, at an earlier stage of their development, have been fully weaned. The method of the invention may be introduced when the ruminant is of an age from full weaning to about 12 months, and may advantageously by employed when feeding bullocks to a slaughtering weight of about 230 kg which they attain faster than conventionally fed animals. Furthermore, it is possible to introduce the feeding method of the invention when the ruminant is of an age between full weaning and parturition, e.g. when the ruminant is a heifer which is unlikely to benefit greatly from the concentrated energy supply present in the liquid feed. This means that it is possible to re-establish the reflexive closure of the oesophageal groove even when the animal has not activated this reflex for a period of from about 12-14 months to about 20 months or even longer.

Finally, the method of the invention may be employed in connection with adult ruminants, e.g. productive, i.e. lactating and/or gestating, cows. In such cases, there will be a close correlation between the amount of liquid feed supplied to the animal and its stage in the lactation period so that less liquid feed will be supplied (as less intensive energy is needed) towards the end of the lactation period and, conversely, more liquid feed will be supplied at the beginning of the lactation period as, at this stage, the milk yield is high, and the energy requirement is correspondingly high. Ruminants other than cattle which may be considered in connection with the present feeding method are sheep, buffaloes, camels and goats.

The liquid feed may, of course, be supplied to the dispensing devices in any suitable way such as, most simply, by pouring the liquid feed from a bucket or other container into the dispensing devices manually. However, especially when dealing with large herds, it may be more practical to perform the supply of liquid feed to the dispensing devices automatically. Thus, one way of supplying liquid feed to the dispensing devices is to mix the constituents making up the liquid feed in a container provided with a stirrer and pump the resulting mixture to the dispensing device provided at each feeding place through a feed conduit through which the liquid feed is continuously or sequentially pumped until the desired amount of liquid feed has been supplied to all the dispensing devices. One system which may be utilized for this purpose, with minor modifications, may be a conventional system for feeding liquid feed to pigs, provided that the dispensing devices according to the invention are connected to such a system. It is contemplated to adapt the supply of liquid feed to the individual requirements of each animal so that the amount of liquid feed supplied to each dispensing device will depend on the specific requirements of each individual animal to be fed at this particular dispensing device, such as its production level, its weight, or condition (e.g. whether or not it is gestating). Such a specialized or individualized supply may be regulated by means of a computer programmed for this purpose; such a regulation is conventional for dispensing dry feed concentrates to untethered animals kept in the same enclosure, for instance cattle in a cattle yard, in order to ensure an individual supply of feed to each animal, and may readily be adapted to regulate the supply of liquid feed in a similar manner.

Generally speaking, however, the total amount of liquid feed supplied during each feeding period is in the range of 0.1-20 l, preferably 0.5-10 l, dependent on the weight and production level of the animal to be fed. The supply of liquid feed may be dispensed 1-12, preferably 2-8, times a day. It is at present assumed that an optimal feed utilization may be obtained by supplying the liquid feed about 5 times a day.

The invention also relates to an enclosure for housing ruminants. The enclosure comprises a liquid feed dispensing device provided with supply means for supplying liquid feed to a ruminant and outlet means adapted to discharge the liquid feed when activated by the ruminant and located at a level substantially above the level of the shoulders of the ruminant to be housed in the enclosure, i.e. at such a level that the animal is forced to stretch its head and neck upwards in order to reach the outlet means so as to substantially assume the suckling posture of an unweaned animal of the same species. The supply means preferably comprise a container for liquid feed communicating with the outlet means and metering means for metering the specific dosage of liquid feed to be dispensed to the ruminant. These metering means may suitably comprise means for varying the volume of the container.

One embodiment of the supply means is one in which the container comprises a cylinder and the metering means comprise a piston displaceably arranged therein. An extreme position of the piston in the cylinder and hence the maximum volume of the cylinder may be determined by placing a stop member above the piston to prevent it from rising beyond a predetermined level, the stop member being of a size selected to provide a desired container volume. The stop member may be replaced with another of a different size to provide a larger or smaller volume as desired. The piston itself may be weighted so as to exert a suitable pressure on the liquid feed when this is being dispensed and ensure a substantially complete emptying of the container caused by the downward movement of the piston. An alternative way of providing a sufficient pressure may be to place a bell-shaped member above the piston at the lower edge of the stop member. The bell-shaped member is connected to a water supply in such a way that a variable water pressure may be established above the piston. To fill the container, a greater pressure is exerted by the liquid feed flowing into the container than the pressure exerted by the water so that the piston moves upwards to the edge of the stop member. When, on the other hand, liquid feed is being dispensed to the ruminant, the water pressure will be sufficient to move the piston downwards in the cylinder as no counterpressure is exerted.

When the liquid feed to be supplied to the ruminant is one which contains lactic acid bacteria, it is important that the piston fits tightly to the cylinder walls in order to secure anaerobic conditions.

Another, currently more favoured, embodiment of the means for supplying liquid feed to a ruminant is one in which the container is made of an inflatable material, and the metering means comprise a detachable outer container of a stiff material surrounding the inflatable inner container so as to define the maximum volume of the inner container. The inner container may be a balloon-like rubber or plastic container (which ensures that the liquid feed is kept under anaerobic conditions) fastened to the top of the outer container, which inner container, when being filled with liquid feed, expands to fill the volume defined by the outer container. This may be made of a stiff material such as a metal (aluminum, zinc, sheet metal) or plastic. The inner and outer containers may be exchanged for other containers of a different size according to the desired dosage of liquid feed to be dispensed.

The supply means may also be ones in which the container is a container of a flexible material, and the metering means comprise a pair of compression members for adjustably compressing part of the container walls therebetween. Thus, the container may comprise a section of a gummed canvas tube which is closed at the top and suitably suspended. The compression members may comprise a pair of rollers slidably attached to a frame arranged so as to surround the container. The rollers are arranged opposite each other in such a way that the container walls are squeezed tightly together. The frame is provided with stop members to determine the extreme position of the rollers and hence the maximum volume of the container. When the container is being filled with liquid feed, the rollers are pressed upwards to the lower edge of the stop members, while, when the liquid feed is being dispensed, the rollers move downwards to ensure that the container is emptied and that a suitable pressure is maintained.

The supply means may furthermore be ones in which the container is in the form of a flexible hose cooperating with a movable compression member so as to form a peristaltic pump which is made to operate for a predetermined number of times dependent on the desired amount of liquid feed to be conveyed through the flexible hose and thus dispensed to the ruminant. When the enclosure is one which is adapted to house a single ruminant tethered therein and when, consequently, the dispensing device is to be used by one animal only, the compression member may be made to move by the decrease in pressure occasioned by the emptying of one part of the flexible hose through the outlet means and, concomitantly, by the increased pressure exerted by the liquid feed flowing into another section of the flexible hose on the other side of the compression member. When, on the other hand, several untethered animals are kept in the same enclosure and, consequently, the dispensing device is to be shared by several animals, each requiring a different amount of liquid feed, it is preferred to employ an engine to move the compression member as this makes it easier to regulate the number of times which the pump is made to operate.

The outlet means of the dispensing device may have any suitable shape, i.e. a shape which stimulates the animal feeding at the device to close its oesophageal groove, and may thus be in the form of a spout, nozzle, tap, spigot or section of a rubber tube or metal pipe, optionally provided with a suitable valve to regulate the flow of liquid feed. It is, however, preferred that the outlet means comprise a teat-like member, especially one which is made of a resilient material such as natural or synthetic rubber or plastic. The free end of the teat-like member is suitably provided with a slit-like opening which is at least partly defined by relatively stiff opposite teat wall parts tiltable about fulcrum-like wall portions so as to open the slit-like opening by compressing the teat-like member. The relatively stiff teat wall parts near the slit-like opening may be provided by means of a greater wall thickness or by means of a layer of a stiffer material, such as a harder rubber material or metal material, on the inner surface of the teat wall, or by a combination of these measures. The fulcrum-like wall portions may be formed by a fulcrum member of a stiff material, such as metal, embedded in the teat wall. The cross-section of the space defined by the teat walls is preferably designed so as to prevent a complete collapse of the teat walls when compressed which would otherwise substantially prevent the liquid feed from passing through the teat-like member. The inlet end of the teat-like member may be provided with a check valve in cases where the pressure exerted when dispensing the liquid feed is relatively weak in order to prevent the liquid feed from being pressed back into the container when the ruminant compresses the teat walls.

Alternatively, the teat-like member may comprise an inner and outer tube, the space defined between the inner and outer tubes optionally being filled with a resilient material such as rubber in order to reinforce the teat walls. The inner tube may be made of an expandable material. A closure at the free end of the teat-like member may be provided by means of a clamping member. Those portions of the clamping member which compress the walls of the inner tube may be forced apart by compressing the teat-like member, thereby activating spring members located at or adjacent to the inner walls of the outer tube.

It has been found advantageous to place the outlet means out of reach of the animals when not in use. This serves the purpose of protecting the outlet means from being destroyed as the animals would otherwise tend to contantly "munch" or "nibble" the outlet means, even when no liquid feed is being supplied; also, the appearance of the outlet means serves to stimulate the ruminant to start suckling and concomitantly close its oesophageal groove.

To this end, the enclosure of the invention may further comprise a pivotally mounted shield defining an opening therein, the shield being movable between a protecting position in which the outlet means are covered by the shield, and an exposing position in which the outlet means extend through the opening in the shield and are exposed to the ruminants in the enclosure. In order to prevent the ruminant from reaching the outlet means from the side, the protecting shield may extend substantially across the entire width of the enclosure.

In a preferred embodiment, the dispensing device comprises an inlet opening for liquid feed and a valve movable between a position in which the inlet opening is closed while the outlet means are open, which position is maintained while the ruminant feeds at the device, and a second position in which the outlet means are closed while the inlet opening is open, which position is maintained while liquid feed is being supplied to the container. The valve is preferably a flap valve. Furthermore, operating means may be provided for simultaneously moving the shield from its protecting to its exposing position and the valve from its second to its first position, and vice versa. The operating means may be mechanical means which are activated electronically, mechanically, hydraulically, pneumatically or manually.

The invention is further described with reference to the drawing in which

Figure 2:
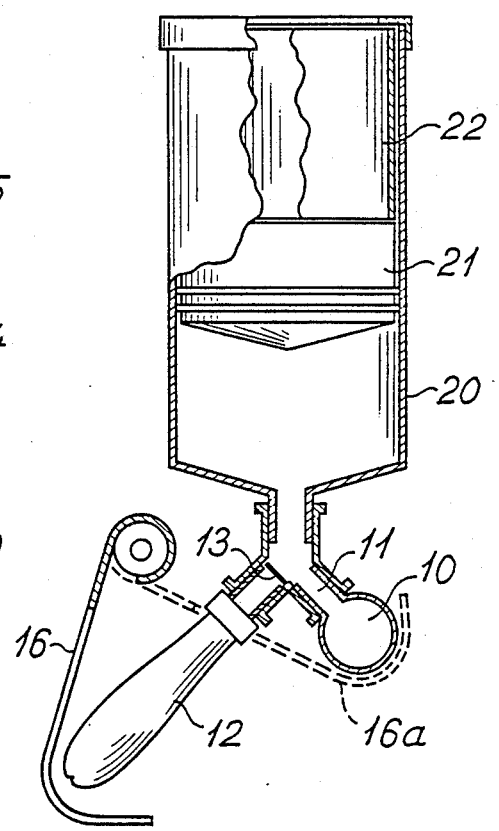
Figure 3:
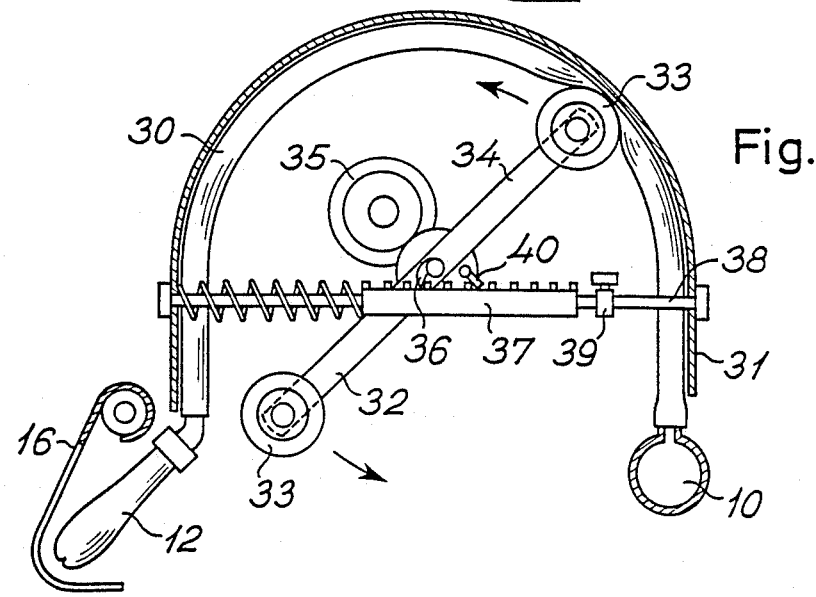
Figure 4:
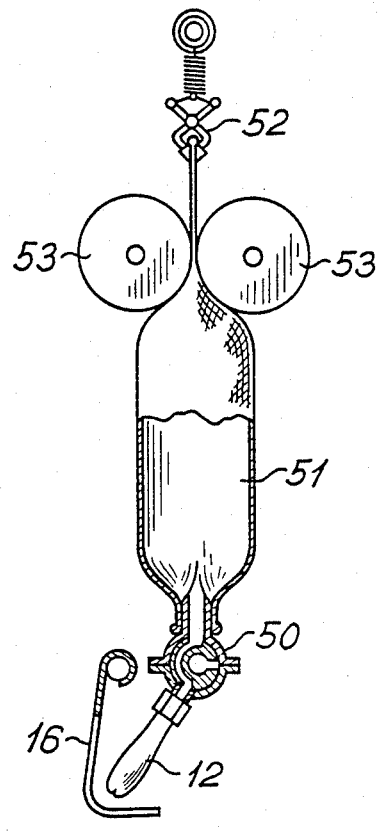
Figure 5:
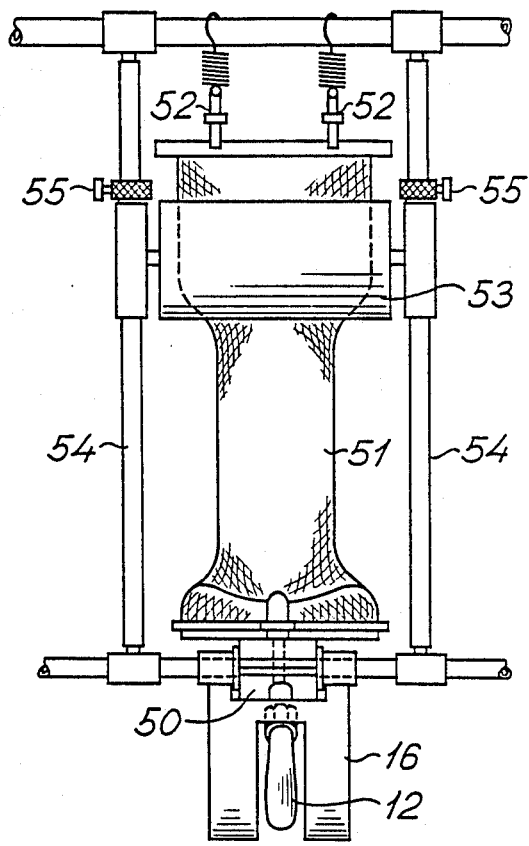
Figure 6:
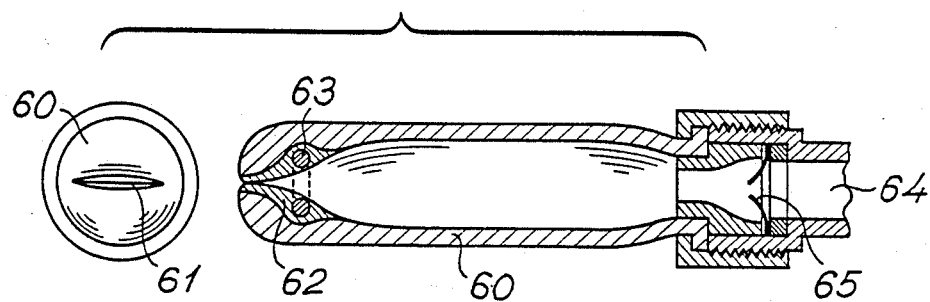
Figure 7:
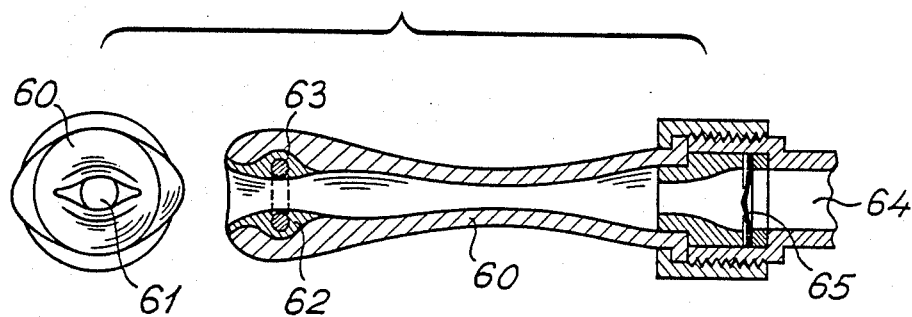
Figure 8:
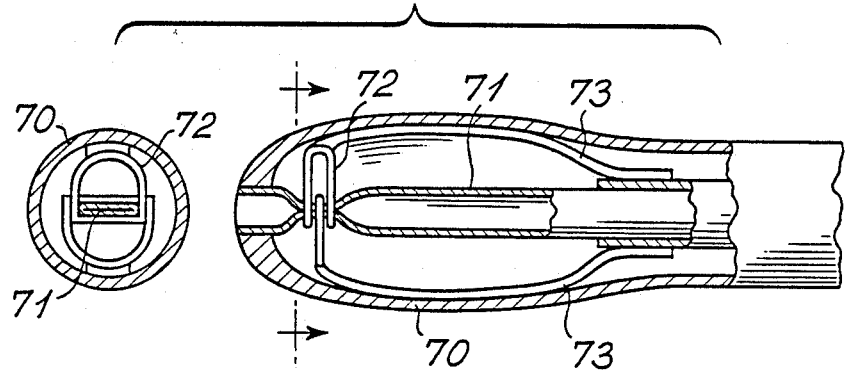
Figure 9:
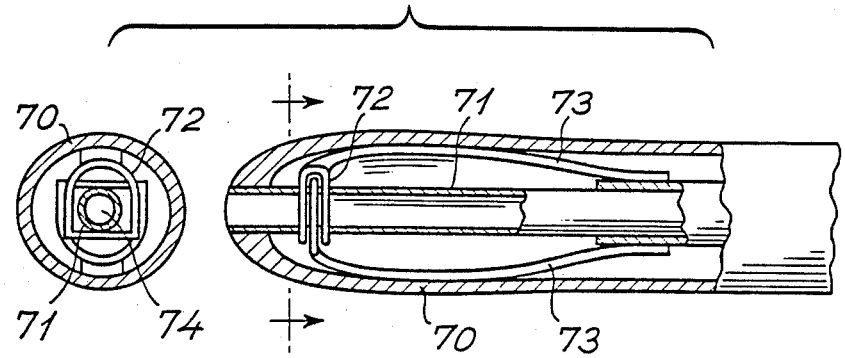

FIGS. 1–4 are sectional views of different embodiments of the dispensing device of the invention, FIG. 5 is a front view of the embodiment of the dispensing device of the invention shown in FIG. 4, FIGS. 6 and 7 show, sectionally and from below, a teat-like member of the invention in a non-compressed and compressed state, respectively, FIGS. 8 and 9 show, sectionally and from below, another embodiment of a teat-like member of the invention in a non-compressed and compressed state, respectively, and FIG. 10 shows an embodiment of an enclosure of the invention.

In FIG. 1, a feed conduit 10 for conveying liquid feed to a dispensing device is connected to an inlet opening 11 for liquid feed and outlet means shaped like a teat 12 adapted to discharge the liquid feed when activated by a ruminant. A flap valve 13 is movable between a position in which the inlet opening 11 is closed while an inlet end of the teat 12 is open and a second position in which the inlet end of the teat 12 is closed while the inlet opening 11 is open. When liquid feed flows through the inlet opening 11, an inner container 14 expands to fill the volume of an outer container 15. A pivotally mounted shield 16 is movable between a protecting position in which the teat 12 is covered by the shield 16 and an exposing position 16a in which the teat 12 extends through an opening in the shield 16. To initiate a feeding period, the shield 16 is moved from its protecting position to its exposing position by operating means (not shown) which are activated electronically, mechanically, hydraulically, pneumatically or manually. The same means are used to move the flap valve 13 from the position in which the inlet end of the teat 12 is closed to the position in which the inlet opening 11 is closed. At the end of the feeding period, i.e. when the container 14 is empty, the shield 16 is moved back to its protecting position, and the flap valve 13 is moved to the position in which the inlet end of the teat 12 is closed.

In FIG. 2, the parts corresponding to the parts shown in FIG. 1 are referred to by the same numerals. Besides, the dispensing device comprises a cylindrical container 20 in which a piston 21 is displaceably arranged. An extreme position of the piston 21 is determined by the lower edge of a stop member 22. When liquid feed flows through the inlet opening 11, the piston 21 is pressed upwards to the lower edge of the stop member 22, and when a ruminant feeds at the dispensing device, the piston 22 moves downwards in the container 20 and assists in emptying it. The shield 16 and flap valve 13 are moved as described above.

In FIG. 3, the parts corresponding to the parts shown in FIG. 1 are referred to by the same numerals. The feed conduit 10 is connected to a flexible hose 30 placed on the inside of a stiff, curving backing member 31 which, sectionally, is substantially semicircular and which defines the circumference of the hose 30 and serves as a support therefor. A movable compression member 32 comprising a pair of rotary rollers 33 connected by a bar or rod 34, the length of which substantially corresponds to the diameter of the backing member 31, is operated by means of an engine 35 to compress the hose 30 so that liquid feed fed to the hose 30 is pressed towards the outlet means 12. A projecting knob 36 located on the pivot shaft of the compression member 32 and adapted to engage with projections or teeth on a slide member 37 adapted to slide along a slide bar 38 fastened to the backing member 31, which knob 36 moves one tooth forwards for each revolution of the compression member 32. The number of revolutions of the compression member 32 is determined by means of a stop 39 adjustably fastened to the slide bar 38. Another projecting knob 40 also engaging with the projections or teeth on the slide member 37 prevents the side member 37 from moving to its initial position. At the end of a feeding period, the compression member 32 is disengaged from the slide member 37, whereby the slide member 37 moves back to its initial position.

In FIGS. 4 and 5, the parts corresponding to the parts shown in FIG. 1 are referred to by the same numerals. A valve 50 regulates the flow of liquid feed to a container 51 of a flexible material which is suspended by means of suspension means 52. A pair of rollers 53 are slidably attached to a frame 54 and arranged so as to compress the walls of the container 51. An extreme position of the rollers 53 is determined by means of stop members 55. When the container 51 is being filled with liquid feed, the rollers 53 are pressed upwards to the lower edge of the stop members 55, while, when liquid feed is being dispensed, the rollers 53 move downwards to ensure that the container 51 is emptied. The shield 16 is operated as described above with reference to FIG. 1.

In FIGS. 6 and 7, a teat 60 of a resilient material is provided with a slit-like opening 16 at the free end, which opening is defined by stiff teat wall parts 62 (provided by a layer of a harder material on the inner surface of the teat wall) tiltable about a fulcrum member 63 so that the slit-like opening 61 is opened when the teat 60 is compressed during suckling (shown in FIG. 7). The inlet end 64 of the teat 60 is provided with a check valve 65 to prevent liquid feed from being pressed back into the container for liquid feed when the teat 60 is compressed.

In FIGS. 8 and 9, a teat comprises an outer tube 70 of a resilient material and an inner tube 71 of an expandable material. A closure of the inner tube 71 at the free end of the teat is provided by means of a hose clamp 72 so as to permit liquid feed to fill and/or expand the inner tube 71. When the teat is compressed during suckling, flat springs 73 located adjacent to the inner walls of the outer tube 70 and connected to the hose clamp 72 are activated, whereby the portions of the hose clamp 72 which compress the walls of the inner tube 71 are forced apart so as to open a passage 74 for the liquid feed.

In FIG. 10, the dispensing device shown in FIG. 1 is mounted in a stall 80. A cow 81 feeding at the dispensing device stretches its head and neck upwards to reach the teat 12. The stall 80 is further provided with a feeding trough 82 for solid feed.

The invention is further described with reference to the following Examples.

EXAMPLE 1

Increase in productivity by split-feeding 2 groups of Friesian dairy cows (2 cows in each group) with an average daily milk yield of 36 kg of milk received, as the solid feed, the same type of wetted roughage mixture ad libitum, consisting of 55% by weight of $NH_3$-treated straw, 24% by weight of molassed, dried beet pulp, 18% by weight of NaOH-treated whole grain barley (NaOH=3% of the barley) and 3% by weight of a mineral-vitamin premix (% by weight of dry matter).

One group also received 7 kg (6.3 kg of dry matter) of a feed concentrate which was dispensed twice a day by conventional means. The feed concentrate contained 40% of barley, 20% of soy bean meal, 20% of coconut cake and 10% of fish meal (% by weight of dry matter).

The other group received 9 l of liquid feed containing 3 kg of easily digestible dry matter which was supplied according to the method of the invention through dispensing devices provided with a teat-shaped outlet 5 times over a period of 24 hours. The liquid feed contained 20% of fish meal, 10% of whey powder, 30% of hydrolyzed toasted soy bean meal, 5% of glucose, 2.5% of corn starch, 2.5% of ground wheat, 5% of a mineral-vitamin premix, 20% of vegetable fat and 5% of animal fat (% by weight of dry matter).

Both groups had free access to drinking water.

The group fed by split-feeding was continuously tested for its rumen content which showed that none of the liquid feed was passed to the rumen, i.e. that the oesophageal groove reflex was fully active. The test may be conducted by labelling the liquid feed with a chromium compound. If no chromium is found in the rumen content sample taken immediately after feeding with the liquid feed, the liquid feed has bypassed the rumen. The sample is taken by suction by means of a gavage passed into the rumen.

The feeding was run for 8 weeks.

On an average, group 1 consumed 11 kg of the roughage mixture, and consumed all 7 kg of feed concentrate. Initially, the cows lost about 400 g/day in weight and later 200 g/day, the total loss of weight over 8 weeks amounting to 18 kg. The milk yield decreased steadily, amounting to a total decrease of 5 kg (to 31 kg/day) over 8 weeks; the content of dry matter in the milk was 12.4% (average) and the content of fat 3.8%.

On an average, group 2 consumed 18 kg of the roughage mixture and drank all the liquid feed. Initially, the cows lost about 200 g/day in weight, but later gained 300 g/day so that the total loss of weight over 8 weeks was 6 kg. Initially, the milk yield increased with 2 kg/day, but decreased over the entire 8-week period with 3 kg to 34 kg/day. The content of dry matter in the milk was 12.4% (average) and the content of fat 4.2%.

On a yearly basis, this result corresponds to an increase in milk yield of about 10% and in the content of fat of about 10.5%. Thus, it may be concluded that a considerable economic advantage may be obtained by feeding dairy cows according to the method of the invention.

EXAMPLE 2

Regulation of the content of unsaturated fatty acids in milk from cows fed by split-feeding 4 cows (Friesian dairy breed) with an average milk yield of 35 kg/day which had been reared on a teat feeding system and which had later (as calving heifers) been trained to control their oesophageal groove reflex closure function, were fed according to the split-feeding method while having free access to drinking water.

The solid feed (dispensed in a trough ad libitum — 16–17 kg/day) contained 50% of chopped $NH_3$-treated straw, 20% of NaOH-treated whole grain barley (3% of NaOH), 25% of molassed beet pulp and 5% of a mineral and vitamin premix (% by weight of the dry matter).

The liquid feed (dispensed through a dispensing device provided with a teat 3 times a day in a quantity of 3 l per feeding period=1.8 kg of dry matter per day) had the following composition:

| Ingredients (% by weight of dry matter) | Composition | | |
|---|---|---|---|
| | I | II | III |
| Fish meal | 25 | 25 | 25 |
| Whey powder | 15 | 15 | 15 |
| Hydrolyzed soy meal | 20 | 20 | 20 |
| Meat-and-bone meal | 5 | 5 | 5 |
| Fish silage | 5 | 5 | 5 |
| Glucose | 5 | 5 | 5 |
| Mineral and vitamin premix | 5 | 5 | 5 |
| Animal fat | 10 | 5 | 0 |
| Vegetable fat (containing about 50% of polyunsaturated fatty acids) | 10 | 15 | 20 |

The animals were divided into two groups so as to obtain as uniform a milk yield between the groups as possible. The three different compositions (varying in their content of polyunsaturated fatty acids were dispensed to each group in turn for 1 week according to the following design:

| Period | Group 1 | Group 2 |
|--------|---------|---------|
| A | II | III |
| B | III | II |
| C | I | I |

Individual milk yields were recorded daily, and milk samples were taken once a week. The samples were analyzed at "Statens Forsogsmejeri" (the Danish State Research Dairy), Hillerod, Denmark.

Results

1. The milk yield may be summarized as follows:

| Group | Composition | | |
|-------|------|------|------|
|       | I | II | III |
| 1 | 34.0 | 34.2 | 35.1 |
| 2 | 35.5 | 36.0 | 36.5 |
| Mean | 34.8 | 35.1 | 35.0 |

It appears that no significant difference was obtained by feeding the cows with the three different compositions.

2. The chemical composition of the milk may be summarized as follows:

| Components | Composition (% of dry matter) | | |
|------------|------|------|------|
|            | I | II | III |
| (Dry matter) | (11.94) | (13.06) | (13.04) |
| Fats | 3.38 | 4.26 | 4.60 |
| Protein | 2.76 | 2.83 | 2.81 |
| Lactose | 5.02 | 4.83 | 4.87 |
| Ash | 0.68 | 0.68 | 0.70 |

It appears from the table that the milk contains a progressively higher amount of fat with an increasing content of vegetable fat in the feed. With respect to the other components, there were only minor differences.

3. The iodine number of the milk may be summarized as follows:

| Group | Composition | | |
|-------|------|------|------|
|       | I | II | III |
| 1 | 33.6 | 44.9 | 49.7 |
| 2 | 39.5 | 52.9 | 54.8 |
| Mean | 36.55 | 48.90 | 52.25 |

It appears from the table that there is a direct and significant relationship between the amount of polyunsaturated fatty acids in the liquid feed and the iodine number of the milk from cows fed according to the split-feeding method (the iodine number of milk from traditionally fed cows is about 25 in winter and 35 in summer).

From this experiment, it may be concluded that 1. cows have no apparent problems in digesting and absorbing the fats passed directed to the abomasum;

2. the overall chemical composition of the milk is only slightly affected by the incorporation of polyunsaturated fatty acids in the feed; and 3. the content of polyunsaturated fatty acids in the milk may be directly influenced by incorporating polyunsaturated fatty acids sources in the liquid feed dispensed to cows according to the split-feeding method.

We claim:

1. A method of feeding cows with fully developed rumens in which the feed is divided into two parts, comprising:

(a) automatically supplying a liquid feed to a herd of said cows in a repetitive manner by use of a dispensing device which comprises supply means for supplying said liquid feed to said cows and a teat-like member adapted to discharge said liquid feed when activated by said cows and located at a feeding place in such a position that the cows are forced to stretch their necks and heads upwards in order to reach the teat-like member, said dispensing device being so designed that the liquid feed is stored and supplied under anaerobic conditions, said liquid feed being supplied to each cow in an amount of 0.5 to 10 liters at each feed period from 2 to 8 times a day, while stimulating each cow to close its oesophageal groove by means of visual stimuli provided by placing the teat-like member out of reach of the cow when not in use and making the teat-like member appear at the beginning of each feed period to stimulate the cow to start suckling and concomitantly close its oesophageal groove, said liquid feed comprising a solution, suspension or slurry of proteins, peptides or amino acids in an amount in the range of 25–100% by weight of the dry matter in said liquid feed, easily digestible carbohydrates in an amount in the range of 0–50% by weight of the dry matter in said liquid feed, and fats in an amount in the range of 15–100% by weight of the dry matter in said liquid feed, in an acceptable liquid, one or more of the components of said liquid feed being partially or completely hydrolyzed, the liquid feed having a pH of less than 6;

(b) supplying a solid feed to each cow in such a way that the oesophageal groove reflex of each cow is not activated during ingestion of said solid feed, said solid feed comprising less digestible carbohydrates constituting at least about 30% of the dry matter in said solid feed and non-protein nitrogen-containing compounds constituting at least about 1% of the dry matter in said solid feed, said liquid feed and said solid feed being independently available through separate dispensing systems, the cows being cows which have been conditioned as young calves to ingest said liquid feed from said dispensing device in the manner indicated in (a), whereby it is possible to re-establish reflexive closure of the oesophageal groove when said cow has not activated said reflex for a period of 12 to 14 months.

2. A method according to claim 1, wherein the amount of proteins, peptides or amino acids is in the range of 30–60% by weight of the dry matter in said liquid feed.

3. A method according to claim 2, wherein the amount of proteins, peptides or amino acids is in the range of about 50% by weight of dry matter in the liquid feed.

4. A method according to claim 1, wherein the proteins are selected from the group consisting of protein-rich by-products of grain processing, legume proteins, potato proteins, palm kernal cake, sunflower cake, cottonseed cake, animal proteins, single cell proteins, and a mixture thereof.

5. A method according to claim 4, wherein the proteins are selected from the group consisting of rice, barley, oats wheat bran, corn gluten, alfalfa, soy bean, lupin, peas, broad bean proteins, casein, whey, blood, serum, meat, bone meal, whole fish meals, fish solubles, krill, fish waste product proteins, and a mixture thereof.

6. A method according to claim 1, wherein the amount of easily digestible carbohydrates is in the range of 5-40% by weight of the dry matter in the liquid feed.

7. A method according to claim 6, wherein the amount of easily digestible carbohydrates is in the range of about 20% by weight of the dry matter in the liquid feed.

8. A method according to claim 1, wherein the easily digestible carbohydrates are selected from the group consisting of sugars, starch, and a mixture thereof.

9. A method according to claim 8, wherein the easily digestible carbohydrates are selected from the group consisting of glucose, fructose, galactose, mannose, lactose, grain starch, barley starch, rye starch, corn starch, oats starch, rice starch, wheat starch, potato starch, and a mixture thereof.

10. A method according to claim 1, wherein the fats are selected from the group consisting of saturated and unsaturated fatty acids, mono-, di- and tri-glycerides of fatty acids, fatty esters, and salts of fatty acids.

11. A method according to claim 10, wherein the mono-, di- and tri-glycerides of unsaturated fatty acids are selected from the group consisting of corn oil, peanut oil, sunflower oil, soy bean oil, mustard seed oil, rape oil, grape seed oil, olive oil and fish oil.

12. A method according to claim 11, wherein the glycerides of unsaturated fatty acid are selected from the group consisting of corn oil, peanut oil, sunflower oil, soy bean oil, mustard seed oil, rape oil, grape seed oil, olive oil, and fish oil.

13. A method according to claim 10, wherein unsaturated fatty acids constitute 10-100% of the total amount of fats in the liquid feed.

14. A method according to claim 13, wherein the unsaturated fatty acids constitute about 40% of the total amount of fats in the liquid feed.

15. A method according to claim 10, wherein the fats are in emulsified form.

16. A method according to claim 17, wherein the carbohydrates, proteins and fats are provided simultaneously by means of ground, extruded, rolled pressed or partly pressed oil seeds selected from the group consisting of soy beans, sunflower seed, flaxseed, cottonseed, peanuts, palm kernels, and rape seed.

17. A method according to claim 1, wherein the carbohydrates, proteins and fats are provided simultaneously by means of ground, extruded or rolled oil seeds in the form of a slurry thereof in a liquid.

18. A method according claim 1, wherein the liquid feed has a high proportion of dry matter.

19. A method according to claim 18, wherein the liquid feed constitutes 15-40% by weight of dry matter.

20. A method according to claim 1, wherein the liquid feed has a pH of less than 6.

21. A method according to claim 20, wherein the liquid feed has a pH of less than 4.5.

22. A method according to claim 1, wherein the liquid feed has additionally been supplemented with amino acids, vitamins, macrominerals, trace elements, growth-promoting agents, hormones or medicaments.

23. A method according to claim 22, wherein the liquid feed has additionally been supplemented with additives selected from the group consisting of lysine, methionine, vitamin E, phosphorus, potassium, sodium, calcium, magnesium, sulfur, cobalt, copper, selenium, zinc, vanadium, iodine, fluorine, maganese, antibiotics, cupric sulphate, citric acid, malic acid, propionic acid, fumaric acid, estrogens, steroids, and anthelmintics.

24. A method according to claim 1, wherein the liquid feed has additionally been supplemented with agents regulating the rheological properties of said liquid feed so as to obtain a higher viscosity thereof.

25. A method according to claim 24, wherein the liquid feed has additionally been supplemented with agents selected from the group consisting of potato pulp, beet pulp, apple pulp, citrus pulp, hydrothermically treated grain, barley seeds, corn seeds, oat seeds, wheat seeds, flaxseed, clays, kaolin, bentonite, diatomaceous earth, colloidal silica, and silicates.

26. A method according to claim 1, wherein the liquid feed is supplied in the form of a thin gruel.

27. A method according to claim 1, wherein the solid feed has a content of nitrogen as free amino acids, peptides or proteins which does not exceed about 1.5% of the dry matter in said solid feed.

28. A method according to claim 27, wherein the solid feed has a content of nitrogen which does not exceed about 1% of the dry matter in said solid feed.

29. A method according to claim 1, wherein the solid feed has a content of fats which does not exceed about 5% of the dry matter in said solid feed.

30. A method according to claim 29, wherein the solid feed has a content of fats which does not exceed about 2.5-3% of the dry matter in said solid feed.

31. A method according to claim 1, wherein
(a) the liquid feed includes the easily digestible carbohydrates or the proteins of forage crops, and
(b) the solid feed includes the cellulosic or the fibrous components of forage crops.

32. A method according to claim 31, wherein the liquid and solid feed are obtained by pressing fresh green forage corps or other fresh forage crops, separating out the resulting juice to obtain said liquid feed, and removing the resulting press cake to obtain said solid feed.

33. A method according to claim 32, wherein the liquid and solid feed are obtained by pressing fresh forage crops selected from the group consisting of green forage crops, roots, and tubers.

34. A method according to claim 31, wherein the forage crop is selected from the group consisting of grass, alfalfa, clover, lupine, peas, water hyacinth, duckweed, sea lettuce, plants of the genus Mimosae, turnip tops, silage, turnips, beets and carrots.

35. A method according to claim 1, wherein the liquid feed is supplied through a dispensing device the presence and function of which stimulates the ruminant so that the oesophageal groove reflex of said ruminant is activated.

36. A method according to claim 35, wherein the dispensing device for the liquid feed is located at a feeding place in such a position that the heat of the ruminant drinking from said dispensing device substantially assumes the suckling posture of an unweaned animal of the same species.

37. A method according to claim 35, wherein the dispensing device for the liquid feed is provided with a teat.

38. A method according to claim 35, wherein the oesophageal groove reflex of the ruminant is reinforced by providing further stimuli selected from the group consisting of acoustic, sensual, visual, electrical, mechanical, chemical and thermal stimuli, and a combination thereof.

39. a method according to claim 1, wherein the ruminant is a ruminant which, at an earlier stage of its development, has been fully weaned.

40. A method according to claim 39, wherein the ruminant is of an age from full weaning to 12 months.

41. A method according to claim 39, wherein the ruminant is of an age between full weaning and parturition.

42. A method according to claim 39, wherein the ruminant is a productive cow.

43. A method according to claim 1, wherein the acceptable liquid is selected from the group consisting of water, plant juice, yeast, cream, animal sera, milk, whey, blood serum, whole blood, and fish solubles; and wherein the less digestible carbohydrates are selected from the group consisting of cellulose and hemicellulose; and wherein said less digestible carbohydrates constitute at least about 60% of the dry matter in the solid feed; and wherein the non-protein nitrogen-containing compounds are selected from the group consisting of urea, ammonium compounds, and nitrates; and wherein said non-protein nitrogen-containing compounds constitute at least about 1.5% of the dry matter in said solid feed.

44. A method according to claim 1, in which during training and automatically supplying liquid feed, audio and visual stimuli are supplied to excite said cow.

45. A method according to claim 1, in which the position of said cow's head during training and automatically supplying liquid feed is different from the position of said cow's head when drinking water.

* * * * *